Sept. 27, 1960        H. F. STIFFLER        2,953,965

APPARATUS FOR INTERMITTENTLY FEEDING FILM

Filed July 5, 1957

INVENTOR.
HAROLD F. STIFFLER
BY
Harold C. Bayer
ATTORNEY

United States Patent Office 2,953,965
Patented Sept. 27, 1960

2,953,965
APPARATUS FOR INTERMITTENTLY FEEDING FILM

Harold F. Stiffler, 42 Rochester St., Scottsville, N.Y.

Filed July 5, 1957, Ser. No. 670,022

3 Claims. (Cl. 88—18)

This invention relates to a method and an apparatus for intermittently feeding film in photographic equipment, such as cameras or projectors.

A principal object of this invention is to provide a method, wherein film may be fed in a camera or projector and accurately located therein for purposes of exposure, so as to produce a high degree of steadiness in the resultant picture.

Another object of this invention is to provide a method, wherein film may be intermittently fed through the gate of a camera or projector and registered with respect to the gate during each cycle in such a manner as to produce a picture of exceptionally fine quality and definition.

A further object of this invention is to provide a method, of the type described, wherein the film is located relatively to the gate of the camera or projector preparatory to each exposure by means of a fixed pin, so as to insure an identity of location of the film relative to the gate during each cycle.

A still further object of this invention is to provide a method, of the type described, wherein the film may be fed at exceptionally high speeds and without damage to the film.

A still further object of this invention is to provide a film feeding apparatus for photographic equipment, such as cameras or projectors, which accurately locates the film therein for purposes of exposure, so as to produce a picture with a high degree of steadiness.

A still further object of this invention is to provide a film feeding apparatus, of the type described, wherein a fixed pin is employed to locate the film relative to the gate, thus maintaining a constant relationship in the registration of the film and the gate.

A still further object of this invention is to provide a film feeding apparatus, of the type described, which is simple in design and operation, and can be produced at relatively low cost.

Other objects and advantages of my invention will be set forth in the claims and will be apparent from the following description, when taken in connection with the accompanying drawings, in which:

Figure 1:
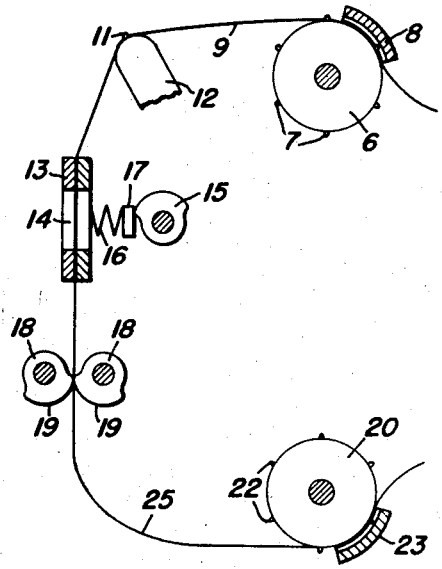
Figure 1 is a somewhat diagrammatic view of the novel apparatus constituting this invention, showing the same in an operative position at the beginning of an exposure.

The apparatus comprising this invention constitutes a feeding mechanism which may be embodied in most conventional cinematographic cameras or projectors. As can be best seen in the diagrammatic views of Figures 1 and 2, the apparatus includes a sprocket wheel 6 having a plurality of teeth 7 which is mounted for rotary movement. The sprocket wheel 6, by means of its teeth 7, feeds film 9 in the direction of a fixed pin 11, which is mounted on a pin holder 12. The pin 11 is adapted to engage perforations 10 of the film 9. A somewhat conventional gate 13 is provided which has an opening 14 therein. The gate 13 is normally open and is operated by means of a rotary cam 15 which functions to alternately open and close the gate by means of a conventional spring 16 and follower mechanism 17. A pair of drive cams 18 are located on the discharge side of the gate 13 and are provided with engaging surfaces 19. The engaging surfaces 19 may be of rubber or any other material which functions to frictionally engage film efficiently. A sprocket wheel 20 is disposed at a location so that the cams 18 are located between the former and the gate 13. The sprocket wheel 20 is similar to the wheel 6 and is also provided with a plurality of teeth 22 and a suitable film engaging shoe 23.

Figure 2:
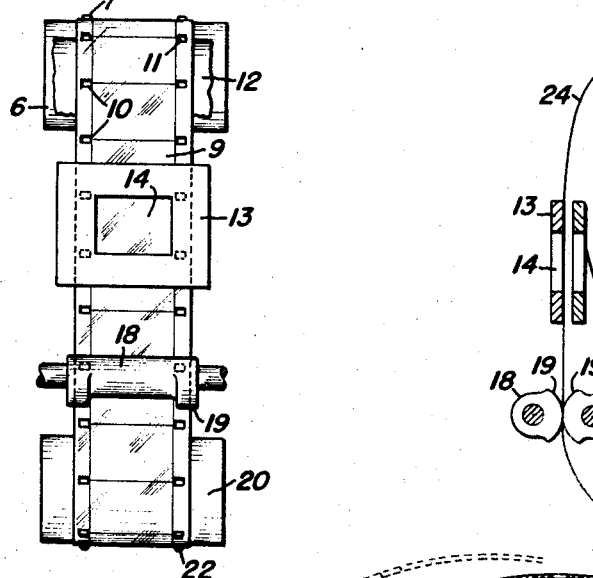
Figure 2 is an end view of the apparatus shown in Figure 1.

As can be seen in Figure 1, the film 9 is fed in the general direction of the gate 13 by means of the sprocket wheel 6. The teeth 7 engage the perforations 10 of the film, causing the film to travel. At the beginning of an exposure, the gate 13 is brought to a closed position by the action of the cam 15, which causes a compression of the spring 16. In this position, the film 9 has been tightly drawn over the fixed pin 11 so that the latter has engaged one of the perforations 10. It will be noted that the portion of the film 9 between the pin 11 and the gate 13 is thereby subjected to tension. At this time, the exposure portion of the cycle commences and the gate 13 is in secure engaging relation with respect to the film 9 to prevent any movement of the latter. The engaging surfaces 19 of the drive cams 18 have just terminated their contact with film 9. The sprocket 20 now commences to take up the slack in the loop 25, which has been formed through the relatively quick feeding action of the drive cams 18.

Figure 4:
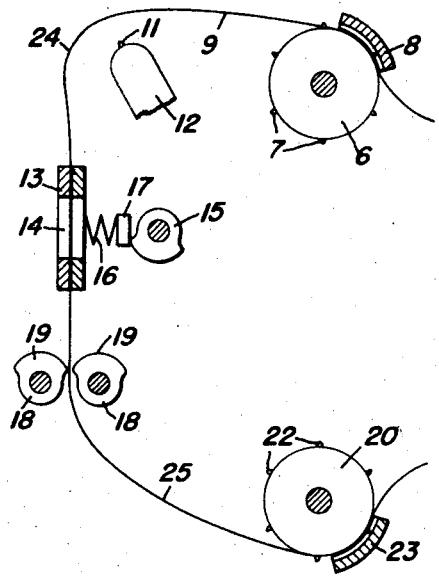
Figure 4 is a view, similar to Figure 1, showing the relative position of the elements of the apparatus at the end of an exposure.

In Figure 4, the relative positions of the parts of the apparatus at the end of the exposure portion of the cycle is shown. It will be seen that the sprocket wheel 6, which rotates at a constant speed, has produced a loop 24 and has thereby caused the film to be removed from its engagement with fixed pin 11. The cam 15 is about to release its engagement with the follower 17, to thereby permit the gate 13 to open and release its engagement with the film 9. The engaging surfaces 19 of the drive cams 18 are about ready to come into engagement with the film 9, which action will rapidly draw the film through the gate so that the next frame thereof is in registration with the opening 14. It will be noted that the sprocket wheel 20 has, during the exposure cycle, removed the slack in the loop 25 which was formed by the quick action of the drive cams 18. The sprocket wheel 20, of course, operates at a constant rate of speed. Therefore, during the exposure portion of the cycle, when the film 9 is locked within the gate 13, the sprocket wheel 20 operates to reduce the slack in the loop 25.

Figure 5:
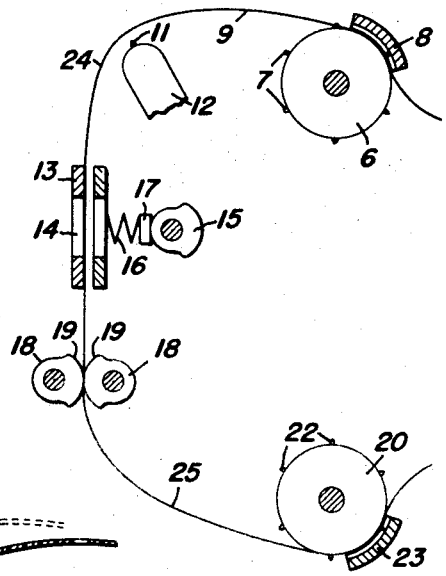
Figure 5 is a view, similar to Figure 1, showing the relative position of the elements of the apparatus with the gate in an open position.
Figure 3:
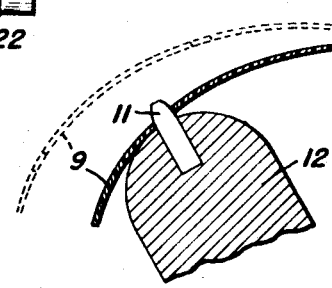
Figure 3 is a fragmentary sectional view of the fixed pin assembly of the apparatus.

During that portion of the cycle, when the film is being pulled through the gate, it can be seen, as shown in Figure 5, that the cam 15 is in such a position as to permit the gate 13 to remain open. At this time the engaging surfaces of the drive cams 18 are in contact with the film 9 so as to rapidly draw the latter through the gate. The length of the engaging surfaces 19 is equal to the distance between the sprocket teeth 7 of the wheel 6 and also to the distance between the teeth 22 of the sprocket wheel 20. Therefore, the drive cams 18 pull through the gate 13 a length of film to cause the pin 11 to engage a perforation 10 at the commencement of each cycle. The drive cams 18, of course, make one complete revolution during each cycle or between each exposure. It is thus seen that the film 9 is pulled through the gate 13 so that the slack in the loop 24 is reduced to the point where a perforation 10 engages the pin 11. The film is held in a state of tension by means of the engaging surfaces 19 until the gate 13 is closed by the action of the cam 15. At this moment, the film is located in position, at which time the distance between the gate and the fixed pin 11 remains constant with the film therebetween in a state of tension. The exposure, therefore, occurs with the film in the same location during each cycle. The pin 11 is in contact with the same portion of the perforation 10 during the exposure portion of each cycle. Heretofore, where fixed pins have been used, there has been a certain amount of play or movement of the film in respect to the fixed pin. It is obvious that this disadvantage is removed by the novel features of this invention. It is clear that the action of the engaging surfaces 19 upon the film 9 causes the production of a certain amount of slack in the loop 25, which is necessary to permit the constant rotation of the sprocket wheel 20 during the exposure portion of the cycle.

A novel method and apparatus for intermittently feeding film has, therefore, been provided wherein the film is subjected to a state of tension immediately preceding the exposure portion of a cycle. At the commencement of the exposure portion of the cycle, a constant length of film exists between the gate and a fixed pin. Therefore, the exposure during each cycle occurs with the frame of the film in precisely the same location relative to the gate. This identity of registration during each cycle results in a picture of unusual steadiness and excellent definition.

Although the specification herein has been confined to the cinematographic arts, the novel method and apparatus of this invention obviously has application to other fields wherein a tape or flexible film is intermittently moved to a point where accurate registration is necessary.

Having thus described my invention, I claim:

1. The combination with a cinematographic instrument, including a gate, a drum rotatably mounted on each side of said gate, control means operatively connected to said gate for alternately opening and closing the latter, and film having longitudinally spaced perforations therein operatively mounted on said drums, of a stationary means fixedly mounted on the feed side of said gate for intermittently engaging the perforations of said film to stop the movement of said film toward said gate and means positioned near the discharge side of said gate for intermittently pulling said film through said gate and toward said stationary means and cooperating with said first-mentioned means to subject said film to a state of tension when said gate is in an open position.

2. The combination wtih a cinematographic instrument, including an intermittently operating gate, a film feeding drum operatively mounted on one side of said gate, a film receiving drum operatively mounted on the other side of said gate, and a film having longitudinally spaced perforations therein operatively mounted on said drums, of a stationary pin mounted between said film feeding drum and said gate and positioned relative to said film such that a tensile force applied to said film at a point between said gate and said receiving drum causes the loop formed by said film to move in the direction of said pin, so that a perforation of said film is engaged by said pin.

3. In a cinematographic instrument, an intermittently operating gate, a film feeding drum operatively mounted on one side of said gate, a film receiving drum operatively mounted on the other side of said gate, said drums being located relative to said gate, so that when a strip of film is operatively mounted thereon, an enclosure is formed, a pin fixedly mounted between said feeding drum and said gate and positioned within said enclosure, and means located between said gate and said receiving drum for applying intermittently a tensile force to said film, so as to cause said film to move in the direction of said pin until a perforation of said film is engaged by said pin.

References Cited in the file of this patent

UNITED STATES PATENTS

| 1,509,092 | Anselmi et al. | Sept. 23, 1924 |
| 1,898,850 | Papo et al. | Feb. 21, 1933 |

FOREIGN PATENTS

| 27,038 | Great Britain | Nov. 18, 1897 |
| 165,869 | Australia | Nov. 3, 1955 |
| 443,085 | Italy | Dec. 6, 1948 |
| 479,049 | Canada | Dec. 4, 1951 |